United States Patent
Doyen

(10) Patent No.: US 12,379,032 B2
(45) Date of Patent: Aug. 5, 2025

(54) DYNAMIC SEALING IN AN AIRCRAFT TURBINE ENGINE CONTROL VALVE

(71) Applicant: SAFRAN AEROSYSTEMS, Plaisir (FR)

(72) Inventor: Emmanuel Doyen, Moissy-Cramayel (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 0 days.

(21) Appl. No.: 18/552,584

(22) PCT Filed: Mar. 23, 2022

(86) PCT No.: PCT/FR2022/050545
§ 371 (c)(1),
(2) Date: Sep. 26, 2023

(87) PCT Pub. No.: WO2022/208001
PCT Pub. Date: Oct. 6, 2022

(65) Prior Publication Data
US 2024/0167571 A1    May 23, 2024

(30) Foreign Application Priority Data
Mar. 30, 2021  (FR) ...................................... 2103239

(51) Int. Cl.
*F16K 1/226* (2006.01)
*F02C 9/00* (2006.01)
*F16K 1/22* (2006.01)

(52) U.S. Cl.
CPC .............. *F16K 1/2268* (2013.01); *F02C 9/00* (2013.01); *F16K 1/224* (2013.01)

(58) Field of Classification Search
CPC .......... F16K 1/2268; F16K 1/224; F02C 9/00
USPC ....................................... 251/305–308, 335.3
See application file for complete search history.

(56) References Cited

U.S. PATENT DOCUMENTS

| | | | |
|---|---|---|---|
| 2,467,960 A | 4/1949 | Brady, Jr. | |
| 3,232,310 A * | 2/1966 | Treder | F16K 1/48 251/308 |
| 3,741,520 A * | 6/1973 | Richmond | F16K 1/302 251/340 |
| 3,979,104 A | 9/1976 | LaCoste et al. | |

(Continued)

OTHER PUBLICATIONS

International Search Report mailed Jul. 4, 2022, issued in corresponding International Application No. PCT/FR2022/050545, filed Mar. 23, 2022, 5 pages.

(Continued)

*Primary Examiner* — John Bastianelli
(74) *Attorney, Agent, or Firm* — CHRISTENSEN O'CONNOR JOHNSON KINDNESS PLLC

(57) ABSTRACT

A control valve, in particular for an aircraft turbine engine, includes a movable seal which is carried by a rod that passes through ports of a body of the valve. Sealing means are mounted in each of these ports. The sealing means include a tubular bellows mounted around the rod, a ring mounted around the rod and the tubular bellows and at least partially housed in one of the ports, and a washer mounted around the rod. The washer is inserted between the tubular bellows and one end of the ring which bears against the bottom of said port.

11 Claims, 8 Drawing Sheets

(56) References Cited

U.S. PATENT DOCUMENTS

| | | | | |
|---|---|---|---|---|
| 4,537,385 | A * | 8/1985 | Bragg | F16K 41/00 |
| | | | | 137/553 |
| 5,988,589 | A | 11/1999 | Mowill | |
| 8,727,311 | B2 * | 5/2014 | Ehrne | F16K 41/04 |
| | | | | 251/355 |
| 10,267,423 | B2 * | 4/2019 | Hatton | F16J 15/185 |
| 2015/0219148 | A1 * | 8/2015 | Wemhoener | F16C 33/36 |
| | | | | 384/558 |

OTHER PUBLICATIONS

Written Opinion mailed Jul. 4, 2022, issued in corresponding International Application No. PCT/FR2022/050545, filed Mar. 23, 2022, 6 pages.

* cited by examiner

DYNAMIC SEALING IN AN AIRCRAFT TURBINE ENGINE CONTROL VALVE

FIELD OF THE DISCLOSURE

The present disclosure relates to the field of dynamic sealing for continuous or oscillating rotational movements and is intended for an aircraft turbine engine control valve. The control valve can be a butterfly valve, an exhaust valve, etc.

BACKGROUND

An aircraft turbine engine comprises several fluid circuits which comprise valves. The valve technologies comprise control valves.

A control valve 10, such as that shown in FIGS. 1 and 2, is a valve comprising an annular body 12 in which an obturator can move in rotation or with more complex kinematics. In the example shown in these figures, the control valve 10 is a butterfly valve, i.e. its obturator is formed by a butterfly 14. The body 12 comprises a main axis A or axis of revolution which corresponds to the axis of flowing of a fluid through the valve. The butterfly 14 has a disc shape complementary to the internal shape of the body 12. The external diameter of the butterfly 14 is therefore substantially equal to the internal diameter of the body 12. The butterfly valve is movable between a position of obstruction of the internal passage 18 defined by the body 12, in which it extends for example in a plane perpendicular to the axis A, and a position of maximum release of this passage 18. FIGS. 1 and 2 show the butterfly 14 in intermediate positions.

The butterfly 14 is carried by a rod 16 which extends transversely to the passage 18 inside the body 12 and which defines the axis B of rotation of the butterfly. This rod 16 passes through orifices 20 opening into the conduit 18 and made in the body 12 and is guided in rotation in these orifices by bearings 22.

The rod 16 passing through the body 12 creates a risk of leakage in this area. The pressure of the fluid inside the body 12 is generally higher than the pressure outside the body 12, and fluid flowing into the body is likely to escape through the orifices 20 (arrow F1). It is therefore necessary to provide sealing means in the orifices 20 for mounting the rod 16.

In the current technique, the sealing means are formed by elastomer O-rings, which are mounted in annular gorges in the orifices 20 and cooperate with the rod 16. They provide a dynamic sealing around the rod 16 during operation of the valve 10.

In some applications, this solution may not be effective or sufficient. This is particularly the case in an aircraft turbine engine where the valve 10 can be used in a circuit where a fluid circulates at a very high pressure and/or a very high temperature (for example of the order of 600° C.).

The document U.S. Pat. No. 3,979,104 describes a butterfly valve comprising a body inside which an obturator is mounted so that it can rotate about an axis by means of a rod. This rod passes through orifices in the body and is guided by bearings. Sealing systems are mounted in these orifices and comprise two bellows. The axial deformation stroke of each bellow can be defined by axial support of parts independent of the rod and mounted around the rod. The technology described in this document has the disadvantage of being complex, requiring many parts, and of being bulky.

The present disclosure proposes a solution to this problem, allowing a control valve to be used in extreme conditions of high pressure and/or high temperature.

SUMMARY

The disclosure proposes a control valve, in particular for an aircraft turbine engine, the control valve comprising:
an annular body having a main axis and defining an internal passage for the flow of a fluid,
an obturator movable inside the body about an axis of rotation, between a position of obstruction of the passage and a position of release of the passage,
a rod for supporting and rotating the obturator, the rod defining the axis of rotation and passing through orifices in the body,
guide devices for guiding the rod which are mounted in the orifices, and
sealing means mounted in each of the orifices around the rod,
wherein sealing means mounted in each of the orifices comprise:
a tubular bellow mounted around the rod, the tubular bellow being elastically deformable in particular along the axis of rotation,
a ring mounted around the rod and the tubular bellow and housed at least partly in one of the orifices, the ring comprising a first axial end which is secured to a first axial end of the tubular bellow and which bears axially against a first annular shoulder of the body, and
a washer mounted around the rod, the washer being interposed between a second axial end of the tubular bellow and a second annular shoulder of the rod, the washer having an external diameter smaller than the internal diameter of the ring which comprises a second axial end configured to bear axially against the second shoulder of the rod in order to define a stroke of axial deformation of the tubular bellow which is axially preloaded so as to maintain the washer axially against the second shoulder.

The control valve according to the disclosure is thus equipped with perfected sealing means which ensure an optimum dynamic sealing during operation of the valve, even under the extreme conditions mentioned above.

The tubular bellow is elastically deformable in the axial direction and can advantageously be preloaded in the axial direction so as to maintain the washer in sealed contact with the second shoulder of the rod. When the rod rotates, the second shoulder slides over this washer and the dynamic sealing is ensured in this area between the second shoulder of the rod and the washer of the sealing means. On the side opposite the washer, the tubular bellow maintains the ring in sealed contact with the first shoulder of the body. This support provides a static sealing in this area. The tubular bellow extends around the rod and the dynamic and static sealings provided at both ends allow to prevent any leakage of fluid from the inside of the tubular bellow to the outside. The interior of the tubular bellow can therefore be placed in fluidic communication with the interior of the body, and the exterior of the tubular bellow can be placed in fluidic communication with the exterior of the valve.

Finally, the ring extends around the tubular bellow and protects it. It rests on the first shoulder and forms a support point for the second shoulder of the rod to limit and control the displacement stroke of the rod and the deformation of the tubular bellow.

The control valve according to the disclosure can be a butterfly valve, an exhaust valve, etc.

The valve according to the disclosure may comprise one or more of the following characteristics, taken alone or in combination with each other:
- the obturator is a butterfly;
- the obturator or butterfly is disc-shaped;
- the obturator or butterfly is movable inside the body about an axis of rotation which is perpendicular to the main axis,
- the guide devices are guide bearings; the bearings are plain or rolling bearings;
- the rod passes through diametrically opposed orifices in the body;
- the first end of the tubular bellow is attached by a rigid non-removable connection to the first end of the ring; the connection is obtained, for example, by welding, brazing, etc.;
- the first end of the ring comprises an internal annular rim, a first annular face of which serves as a support bearing and attachment face for the first end of the tubular bellow, and a second opposite annular face of which serves as a bearing face on the first shoulder of the body;
- the second end of the tubular bellow is attached by a rigid non-removable connection to an annular cup which extends around the rod and which forms a seat for bearing the washer; the connection is obtained, for example, by welding, brazing, etc.;
- the washer is attached to the cup by a chemical or mechanical connection;
- the cup comprises an axial annular rim interposed radially between the washer and the second end of the tubular bellow;
- a helical spring is mounted around the rod and inside the tubular bellow, the spring being interposed axially between the first shoulder of the body and the washer;
- the spring bears axially on the first shoulder and on the cup respectively;
- the ring is connected, in particular by shrink-fitting, gluing or brazing, in the orifice; this allows to create an additional static sealing between the sealing means and the body of the valve;
- the washer is made of a mineral, organic or metallic material which may or may not have undergone a functionalization treatment, and/or the tubular bellow is made of a metallic alloy, or organic material or composite, and/or the ring is made of a metallic alloy, and/or the cup is made of a metallic alloy; the washer is made of graphite, for example;
- each of the orifices comprises two coaxial cylindrical housings, of which a first housing located on the side of the obturator is configured to receive one of the guide devices, and a second housing is configured to receive the sealing means, the first shoulder of the body being located at the junction of these first and second housings.

The present disclosure also relates to an aircraft turbine engine, comprising at least one control valve as described above.

DESCRIPTION OF THE DRAWINGS

The disclosure will be better understood and further characteristics and advantages will become apparent from the following detailed description comprising embodiments, given by way of illustration with reference to the appended figures and presented as non-limiting examples, which may serve to complete the understanding of the present disclosure and the disclosure of its embodiment and, where appropriate, contribute to its definition, whereupon.

DETAILED DESCRIPTION

Figure 1:
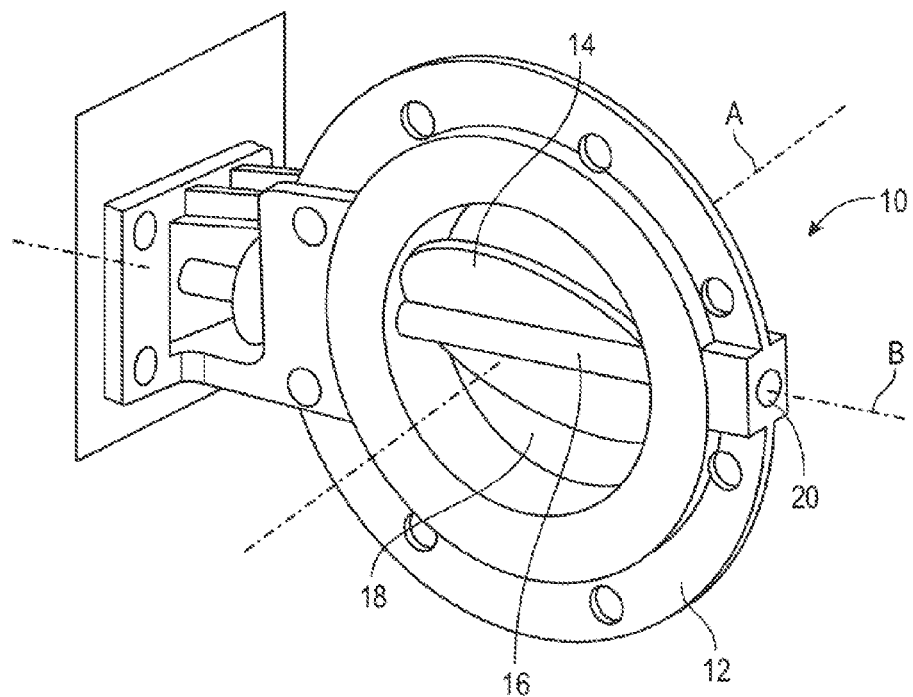
FIG. 1 is a schematic perspective view of a control valve, in particular a butterfly valve.
Figure 2:
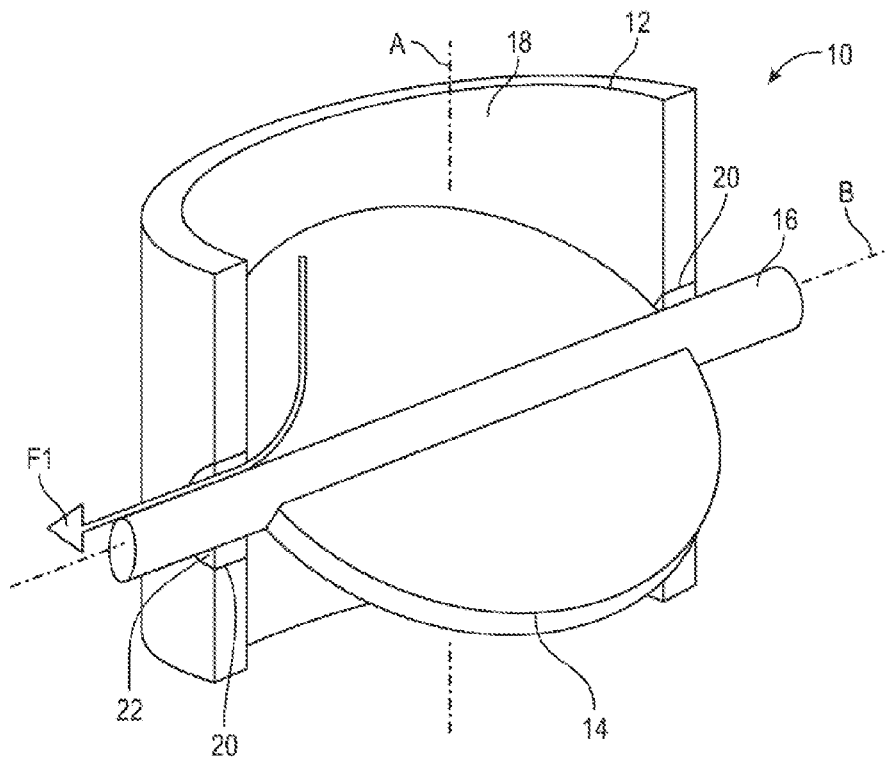
FIG. 2 is a schematic perspective view in axial cross-section of a control valve according to the prior art.

FIGS. 1 and 2 have been described above.

FIGS. 1 and 2 illustrate a control valve 10, which may be a butterfly valve, an exhaust valve, etc. This valve 10 comprises an obturator, which in the example shown is a butterfly valve. The control valve 10 according to the disclosure differs from that of the prior technique essentially by its sealing means 24 which are mounted in each of the orifices 20 around the rod 16. The above description of other aspects and characteristics of a control valve 10 therefore applies to the control valve according to the disclosure.

As mentioned above, a control valve 10 comprises:
- an annular body 12 having a main axis A and defining an internal passage 18 for the flow of a fluid, such as air for example,
- an obturator, such as a butterfly valve 14, which is movable inside the body 12 about an axis of rotation or a system of exhaust axes B passing through the main axis A and for example perpendicular to this main axis A, between a position of obstruction of the passage and a position of release of this passage,
- a rod 16 for supporting and rotating the butterfly 14, this rod 16 defining the axis of rotation B and passing through orifices 20, for example diametrically opposed, in the body 12,
- guide device for guiding the rod 16, such as bearings 22, which are mounted in the orifices 20, and
- sealing means 24 mounted in each of the orifices 20 around the rod 16.

FIGS. 3 to 6 illustrate a first embodiment of these sealing means 24.

The sealing means 24 mounted in each of the orifices 20 essentially comprise:
- a ring 26 mounted around the rod 16, a washer 28 mounted around the rod 16 and intended to bear on a second annular shoulder 30 of the rod 16, this annular shoulder 30 being formed, for example, by a rib, and a tubular bellow 32 mounted around the rod 16 and interposed axially between the washer 28 and one end of the ring 26.

In FIGS. 3 to 6, the body 12 of the valve is partly and schematically shown. These figures show a non-limiting example of embodiment of the orifices 20, each of which comprise two coaxial cylindrical housings 20a, 20b. These housings 20a, 20b have different diameters, the housing 20a of smaller diameter being located on the side of the butterfly 14 and therefore on the inside of the valve 10, and therefore the housing 20b of smaller diameter being located on the outside.

Figure 6:
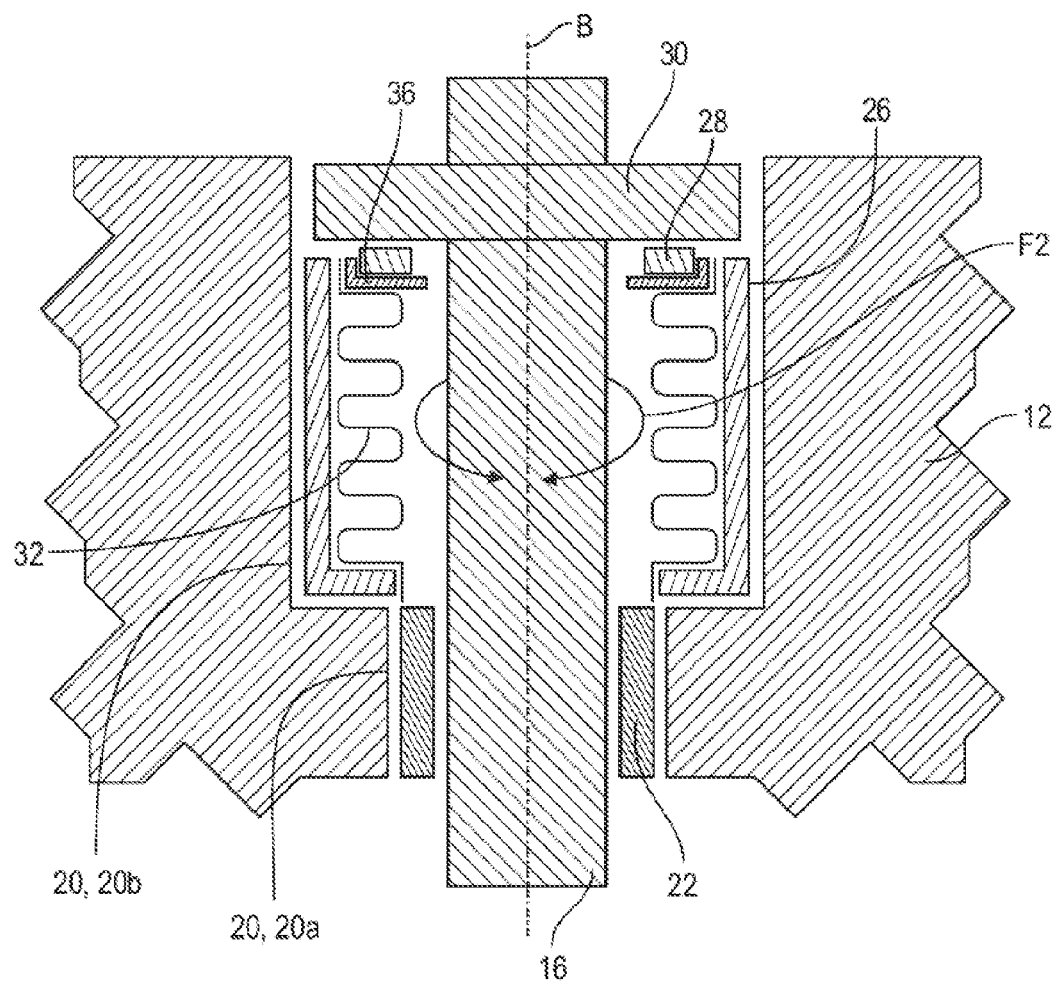
FIG. 6 is a partial schematic view in axial cross-section of the control valve shown in FIG. 3.
Figure 7:
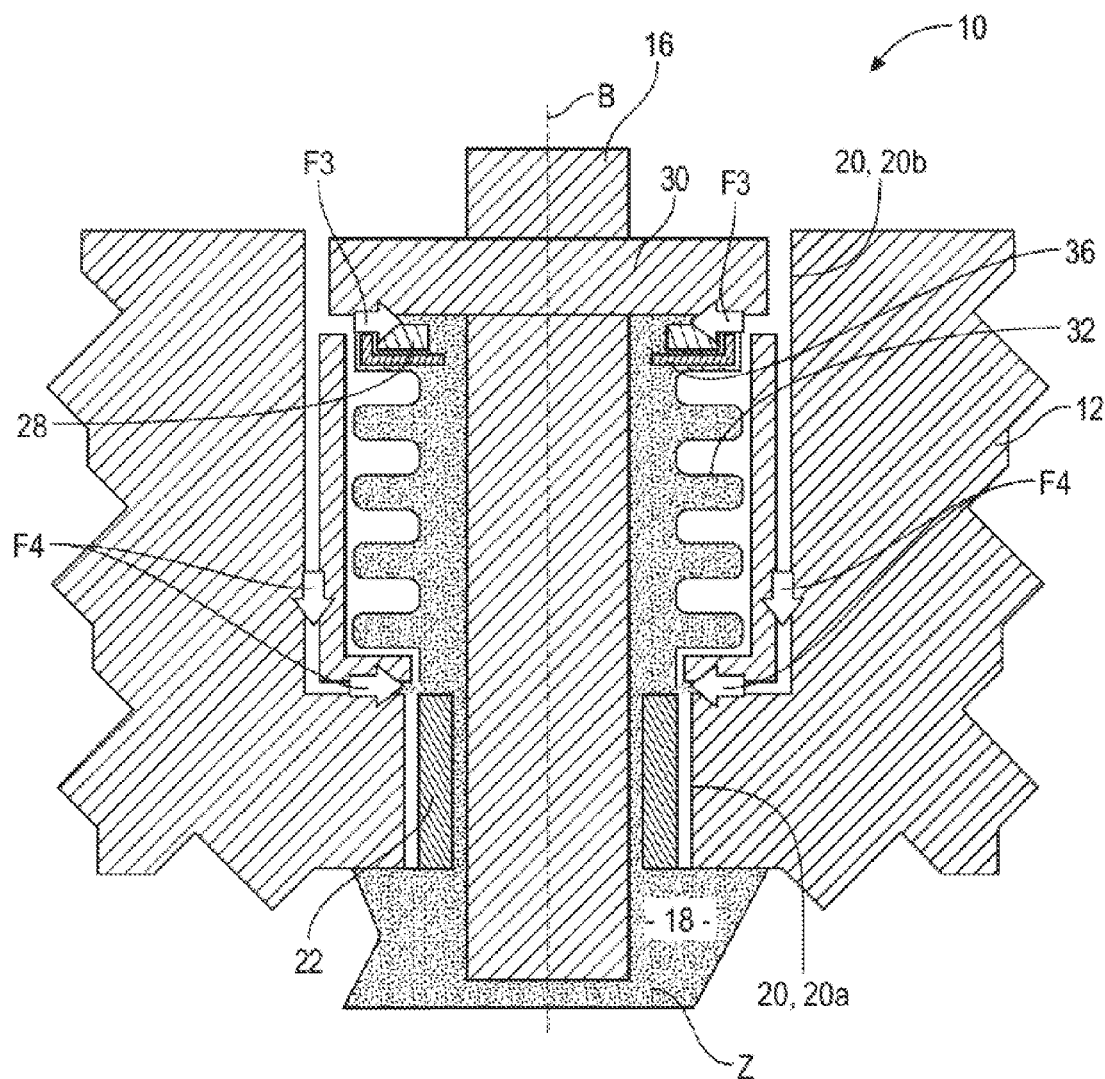
FIG. 7 is another partial schematic view in axial cross-section of the control valve of FIG. 3.

The orifice 20 comprises a first annular shoulder 20c which in this case is located at the junction between the housings 20a, 20b. The housing 20a can receive the bearing 22, as shown in FIGS. 6 and 7.

The ring 26 is housed at least partly in the orifice 20, and in particular in the housing 20b. In the example shown, it comprises a cylindrical wall 33, one axial end of which is free and forms an axial end 26a of the ring 26, which is located on the side of the second shoulder 30, and an opposite axial end of which is connected to an internal annular rim 34, i.e. an annular rim oriented inwards with respect to the axis B. This rim 34 forms an axial end 26b of the ring 26, opposite the end 26a.

Figure 3:
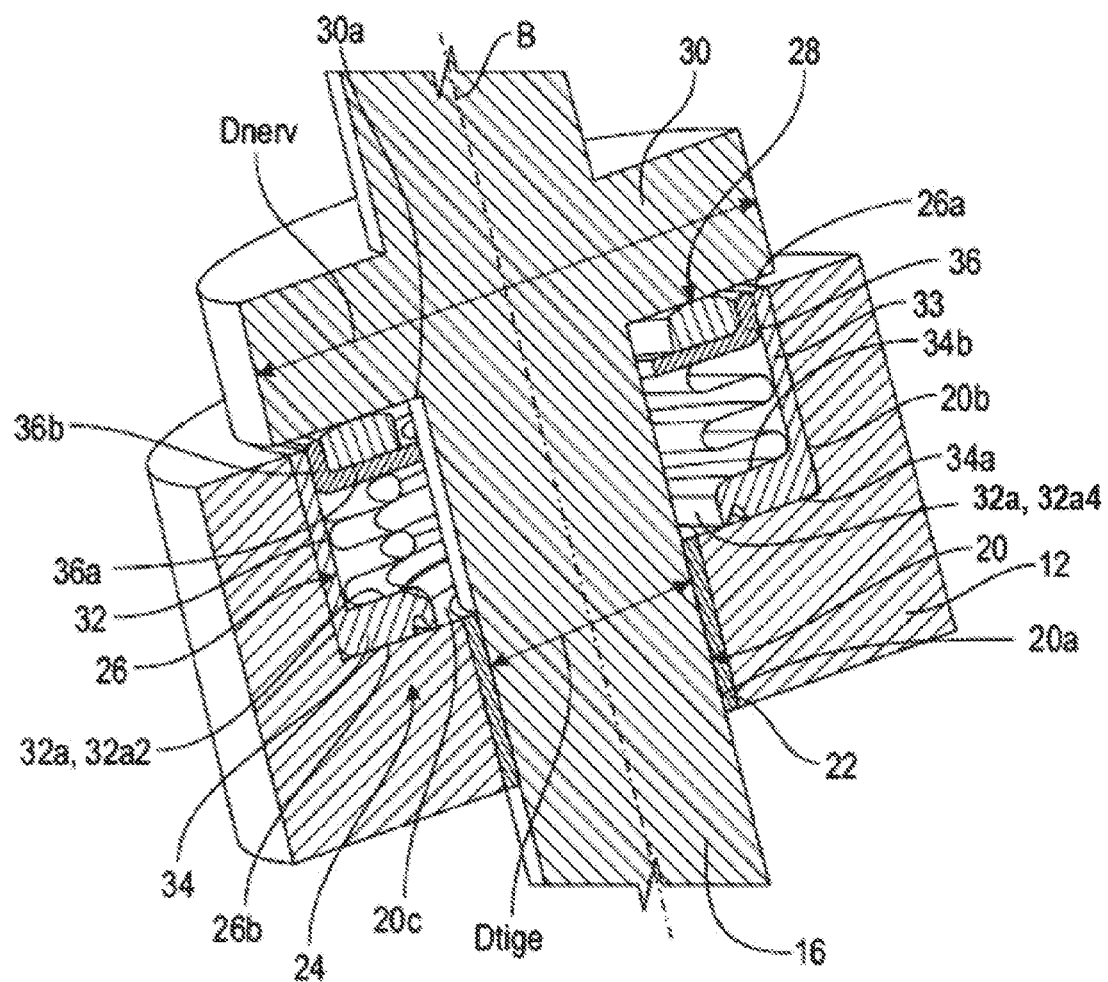
FIG. 3 is a partial schematic perspective view in axial cross-section of a control valve according to one embodiment of the disclosure.
Figure 4:
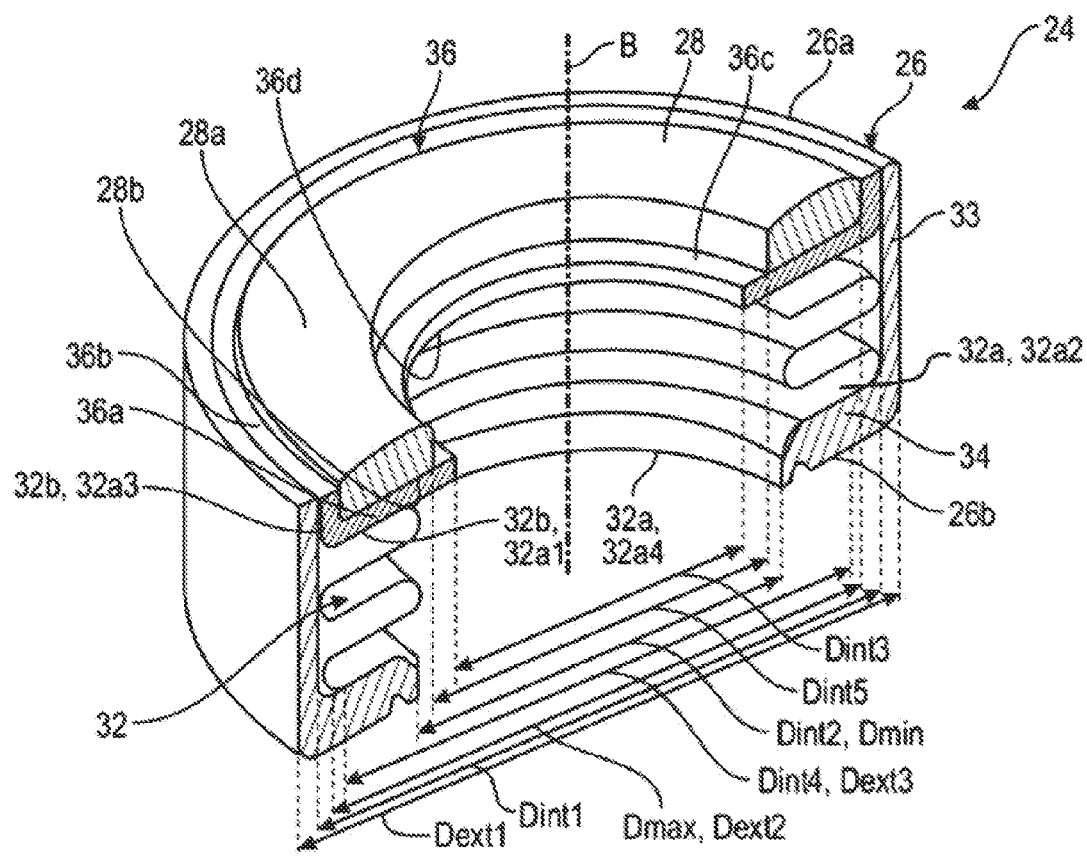
FIG. 4 is a schematic perspective view of the sealing means of the control valve in FIG. 3.

The wall 33 has an external diameter Dext1 (which is also the external diameter of the ring 26-FIG. 4) and an internal diameter Dint1, and the rim 34 has an internal diameter Dint2. The drawings show that Dint2 is greater than Dtige, which is the external diameter of the body of the rod 16, its second shoulder 30 having an external diameter Dnerv which is greater than Dext1 (FIGS. 3 and 4).

The ring 26 is preferably clamped and in particular shrink-fitted in the orifice 20 of the body and in particular in the housing 20b. It is thus understood that there is no clearance (or that this clearance is filled) between the wall 33 and the internal cylindrical surface of the housing 20b and therefore that the internal diameter of this surface is substantially equal to Dext1.

The ring 26 bears axially on the shoulder 20c via its internal rim 34. The rim 34 comprises an annular face 34a bearing against this shoulder 20c, and an opposite annular face 34b.

The tubular bellow 32 bears axially on the face 34b and is attached to the rim 34 and therefore to the end 26b of the ring 26.

The tubular bellow 32 comprises an active area forming at least two corrugations 32a in the example shown (there are 4 in FIGS. 5a to 7). The thickness of the bellow is preferably constant, as its corrugations give it the ability to deform. Each of these corrugations 32a comprises two parallel annular walls 32a1, 32a2, the external peripheries of which are connected to each other by an annular summit 32a3 and the internal peripheries of which are each connected to an annular base 32a4 (see FIG. 5a for example).

In the example shown, the bellow 32 has a maximum diameter Dmax defined by the summits 32a3, and a minimum diameter Dmin defined by the bases 32a4. Dmax is slightly less than Dint1 so that the bellow can be compressed in the ring 26 and the summits 32a3 can slide in the wall 26a of the ring 26 while being guided by it. Dmin is close to Dint2.

The end 32a of the bellow 32 located on the side of the butterfly 14 comprises a base 32a4 which is engaged in the rim 34 and surrounded by this rim 34, and also comprises a wall 32a2 connected to this base 32a4, which in turn bears on the face 34b of the rim 34. The bellow 32 is attached to the ring 26 in this area. Preferably, the end 32a of the bellow 32 is attached to the rim 34, and more preferably the base 32a4 is attached to the internal periphery of the rim 34. This attachment is preferably achieved by welding using an annular weld bead C1 extending around the axis B (see FIG. 5b). The welding is possible when the materials to be welded are metallic or plastic. Alternatively, another type of rigid non-removable connection could be envisaged, such as gluing, which is particularly useful for materials that cannot be welded, such as composites.

The end 32b of the bellow 32, opposite the end 32a, is preferably secured to an annular cup 36 which extends around the rod 16 and forms a seat for the washer 28.

The cup 36 comprises an annular wall 36a, the external periphery of which is connected to a cylindrical rim 36b which is oriented axially towards the second shoulder 30.

The cup 36 comprises an internal diameter Dint3 defined by the internal periphery of the wall 36a, an internal diameter Dint4 defined by the rim 36b, and an external diameter Dext2 defined by the rim 36b. Dint3 is greater than Dtige. In the example shown, Dext2 is less than Dint1 so that the cup 36 can slide axially inside the ring 26 and its wall 33. Furthermore, Dext2 is close to Dmax.

The cup 36 comprises an annular face 36c for supporting the washer 28, and an opposite annular face 36d (FIG. 4).

The end 32b of the bellow 32 comprises a summit 32a3 which is engaged on the wall 36a and surrounds this wall 36a, and also comprises a wall 32a1 connected to this summit 32a3, which in turn bears on the face 36d of the cup 36. The bellow 32 is attached to the cup 36 in this area. Preferably, the end 32b of the bellow 32 is attached to the cup 36, and more preferably the summit 32a3 is attached to the external periphery of the rim 36b. This attachment is preferably achieved by welding using an annular weld bead C2 extending around the axis B (see FIG. 5c). The welding is possible when the materials to be welded are metallic or plastic. Alternatively, another type of rigid non-removable connection could be envisaged, such as gluing, which is particularly useful for materials that cannot be welded, such as composites.

The washer 28 has an external diameter Dext3 close to Dint4 and an internal diameter Dint5 which is greater than Dtige and here greater than Dint3.

The washer 28 comprises two parallel annular faces 28a, 28b, one face 28a of which bears axially against the second shoulder 30 and the other face 28b of which bears axially against the face 36c (FIG. 4). Preferably, the faces 28b, 36c are connected and therefore attached together. The connection may be chemical (glue, cement, etc.) or mechanical (screws, rivets, etc.). Initially, the face 28a of the washer 28 may have a domed cross-section or may have any macro or micro geometry likely to favour the tribological behaviour or the sealing function.

The washer 28 has a thickness, measured along the axis B, which is greater than the height, measured along the same axis, of the rim 36b, so that the washer alone comes into contact with the second shoulder 30. The material of the washer 28 is preferably chosen to wear by friction against the second shoulder 30. The aforementioned domed face 28a can then be flattened to better match the shape of the second shoulder 30 and thus ensure an optimum sealing.

Any reduction in the height of the washer 28 is compensated for by the elasticity of the bellow 32, which maintain this washer 28 against the second shoulder 30 of the rod 16.

The second shoulder 30 comprises an annular face 30a which extends in a plane perpendicular to the axis B and on which the face 28a of the washer 28 bears. The faces 28a, 30a thus bear against each other in a plane perpendicular to the axis B and are intended to rub against each other during operation (i.e. when the rod 16 rotates in the orifices 20—see arrows F2, FIG. 6) so as to ensure a dynamic sealing (arrows F3-FIG. 7) between the rod 16 and the sealing means 24. A static sealing (arrows F4-FIG. 7) is also ensured between the sealing means 24 and the body 12 due to the axial support of the ring 26 on the shoulder 20c or even the shrink-fitting of the ring 26 in the housing 20b.

The interior of the bellow 32 may be in fluidic communication with the passage 18, through the housing 20a and the bearing 22 (see FIG. 7). The outside of the bellow 32 may be in fluidic communication with the outside of the valve 10. FIG. 7 shows the pressure difference areas within the valve according to the disclosure, the area Z corresponding to the choice of:
the overpressure area in the event that the pressure in the conduit 18 of the valve is over pressured relative to the environment,
the depression area if the pressure in the conduit 18 of the valve is in depression with respect to the environment.

Figure 5A:
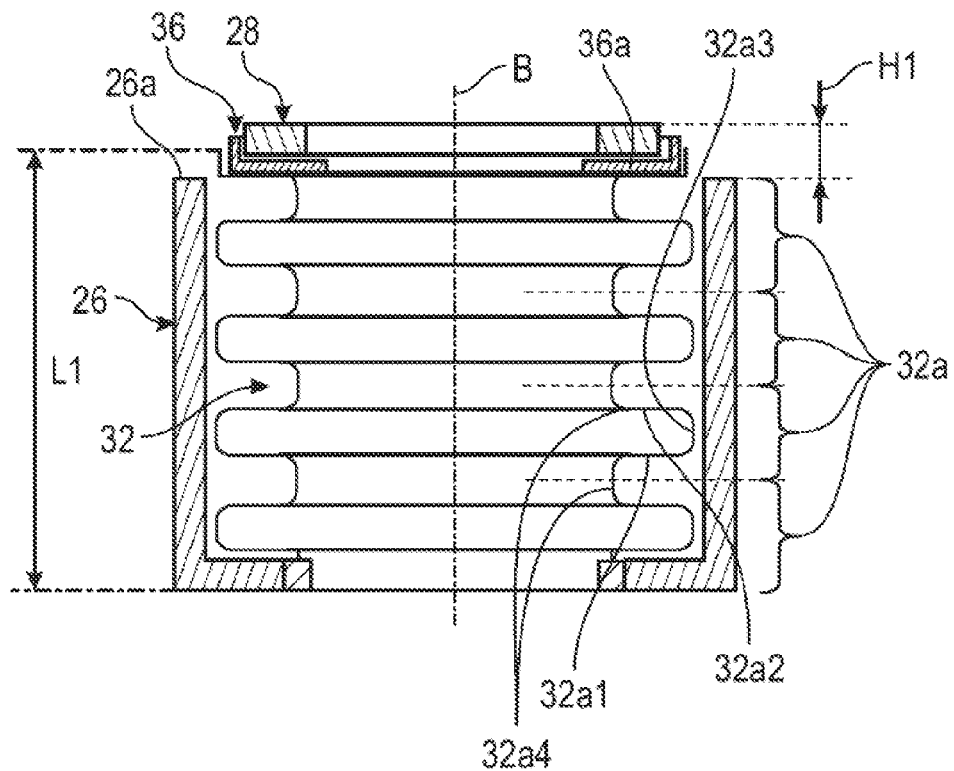
FIG. 5a is a schematic axial sectional view of the sealing means in FIG. 4 and illustrates one position of these means.
Figure 5B:
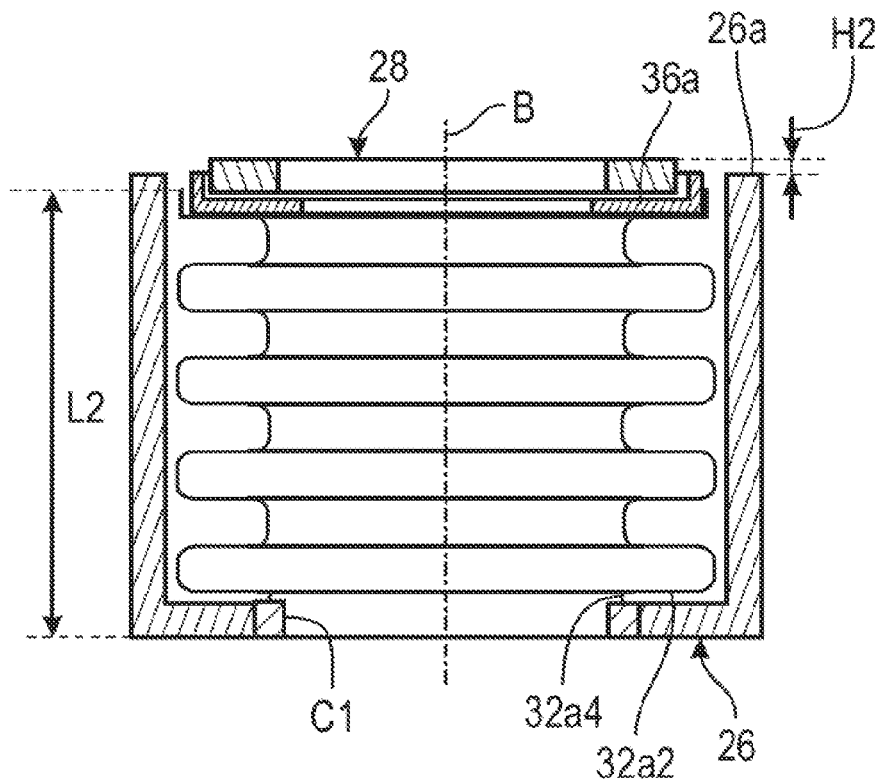
FIG. 5b is a schematic axial sectional view of the sealing means of FIG. 4 and illustrates another position of these means.
Figure 5C:
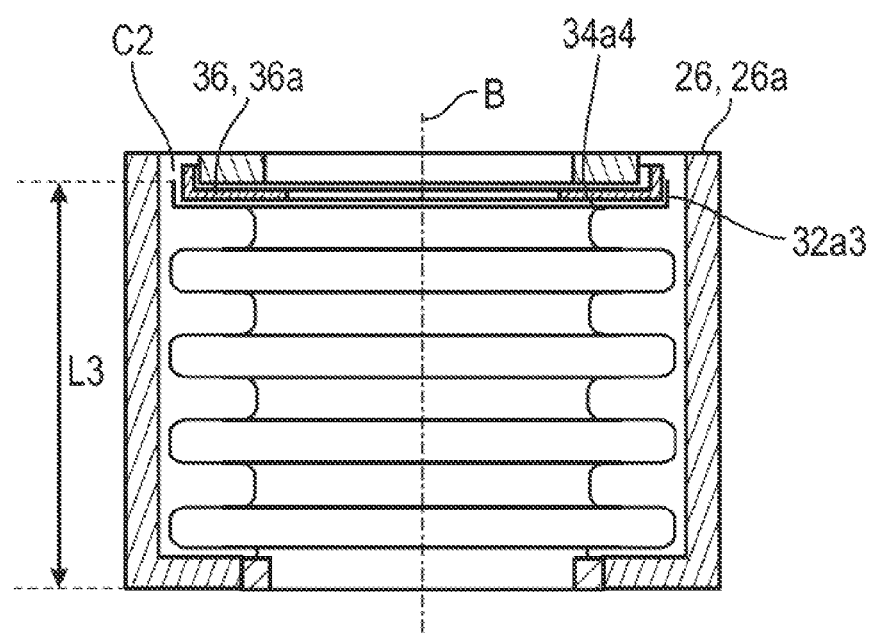
FIG. 5c is a schematic axial sectional view of the sealing means of FIG. 4 and illustrates another position of these means.

FIGS. 5a to 5c show three distinct positions of the sealing means 24. In FIG. 5a, the left-hand drawing, the sealing means 24 are in a free, unloaded state, i.e. the bellow 32 is not loaded. The sealing means 24 are not yet mounted in the valve. The bellow adopts a free or rest position in which it has an axial length or dimension L1. In this position, the face 36a of the washer 36 is at an axial distance H1 from the end 26a of the ring 26.

In FIG. 5b, the middle drawing, the sealing means 24 are in the mounted state in the orifice 20 of the body 12 of the valve 10. The bellow 32 is axially preloaded in this position so that it has an axial length or dimension L2. The face 36a of the washer 36 is at a predetermined axial distance H2 from the end 26a of the ring 26, which is equal to the difference between L1 and L2. This distance H2 corresponds to the maximum axial deformation stroke of the bellow 32 in operation and therefore of the axial displacement of the washer 36 along the axis B.

In FIG. 5c, shown on the right, the sealing means 24 are fully axially loaded. The face 36a of the washer 36 and the end 26a of the ring 26 are located in the same plane perpendicular to the axis B. This occurs when the second shoulder 30 of the rod 16 bears axially on the end 26a of the ring 26. The second shoulder 30 thus bears on the ring 26 rather than on the body 12 of the valve 10. To achieve this, Dnerv can be between Dint1 and Dext1, as shown in FIGS. 6 and 7. In the alternative shown in FIG. 3, Dnerv would be greater than Dint1, potentially greater than Dext1, and the ring 26 would have an axial length or dimension greater than that of the housing 20b so that the end of the ring 26 projects (at least slightly) outside the housing 20b. In this position, the bellow 32 has an axial length or dimension L3, which is equal to L2-H2.

The bellow 32 can thus perform several functions such as: providing a static sealing in the orifice 20, urging the washer 28 against the second shoulder 30 on the rod 16 due to the axial compression of the bellow 32, compensating for wear and differential thermal expansion of the parts, etc.

The ring 26 can thus perform several functions such as: guiding the axial movement of the washer 28 and of the cup 26, protecting the bellow 32, the assembly interface of the sealing means 24 with the body 12 of the valve 10, a stop to limit the accidental compression of the bellow 32, an additional static sealing with the body 12 of the valve, etc.

Figure 8:
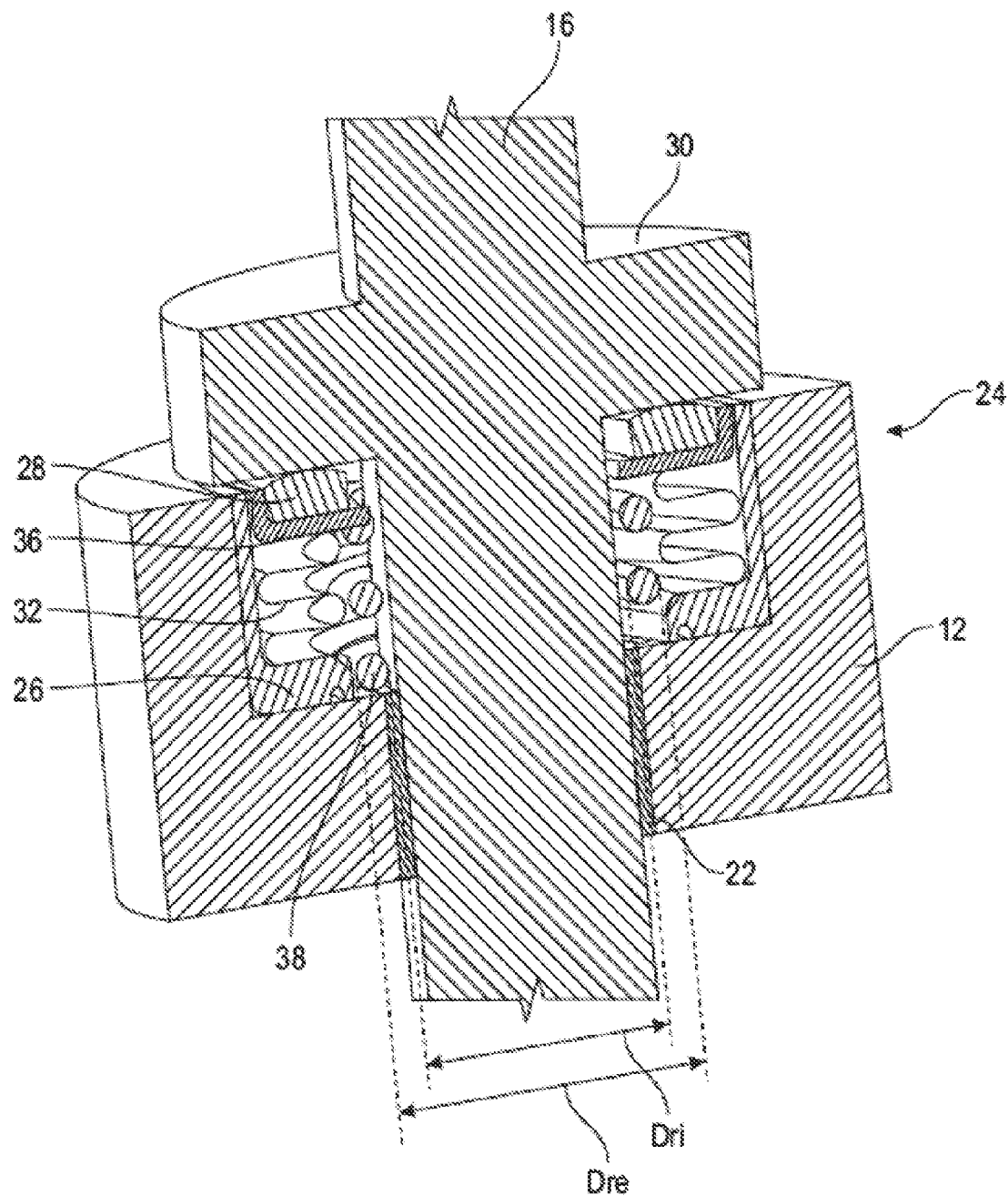
FIG. 8 is a partial schematic view in axial cross-section of a control valve according to an alternative embodiment of the disclosure.

FIG. 8 illustrates a variant of embodiment of the sealing means 24 which comprises a spring 38 in addition to the characteristics of the first embodiment. The spring 38 is a helical spring mounted around the rod 16 and inside the bellow 32. The spring 38 is interposed axially between the shoulder 20c of the body 12 and the washer 28 and bears axially against the shoulder 20c and the cup 36 respectively. The spring 38 has an internal diameter Dri greater than Dtige and close to Dint3, and an external diameter Dre smaller but close to Dint2 and Dmin.

The material of the washer 28 preferably has a lower hardness than that of the rod 16, so that it is the washer which wears out preferentially during operation, as mentioned above. The washer 28 is preferably made of graphite. Alternatively, another material could be used, such as a polymer, a composite, a metallic alloy, etc. The tubular bellow 32, the ring 26 and the cup 36 can be made of a metallic alloy, an organic material or a composite.

The invention claimed is:

1. A control valve, comprising:
an annular body having a main axis and defining an internal passage configured to receive a flow of a fluid,
an obturator movable inside the body about an axis of rotation between a position of obstruction of the passage and a position of release of said passage,
a rod configured to rotatably support the obturator, said rod defining said axis of rotation and passing through orifices of said body,
guide devices mounted in said orifices and configured to guide the rod, and
sealing means mounted in each of said orifices around the rod and comprising:
a tubular bellow mounted around the rod, said tubular bellow being elastically deformable along the axis of rotation,
a ring mounted around the rod and the tubular bellow and housed at least partly in one of the orifices, said ring comprising a first axial end which is secured to a first axial end of the tubular bellow and which bears axially on a first annular shoulder of the body, and
a washer mounted around the rod, said washer being interposed between a second axial end of the tubular bellow and a second annular shoulder of the rod, the washer having an external diameter smaller than an internal diameter of the ring, said ring comprising a second axial end configured to bear axially on said second shoulder of the rod in order to define a stroke of axial deformation of the tubular bellow which is axially preloaded so as to maintain the washer axially against said second shoulder.

2. The control valve according to claim 1, wherein the first end of the tubular bellow is joined by a rigid non-removable connection to the first end of the ring.

3. The control valve according to claim 1, wherein the first end of the ring comprises an internal annular rim, a first annular face of which serves as a bearing and attachment face for the first end of the tubular bellow, and a second opposite annular face of which serves as a bearing face on said first shoulder of the body.

4. The control valve according to claim 3, wherein the second end of the tubular bellow is attached by a rigid non-removable connection to an annular cup which extends around the rod and which forms a seat for bearing said washer.

5. The control valve according to claim 4, wherein the cup comprises an axial annular rim interposed radially between the washer and the second end of the tubular bellow.

6. The control valve according to claim 1, wherein a helical spring is mounted around the rod and inside the tubular bellow, said spring being interposed axially between said first shoulder of the body and said washer.

7. The control valve according to claim 4, wherein the spring bears axially against said first shoulder and said cup respectively.

8. The control valve according to claim 1, wherein the washer is a mineral, organic or metallic material, and/or the tubular bellow is made of a metallic alloy, an organic material or a composite, and/or the ring is made of a metallic alloy.

9. The control valve according to claim 1, wherein each of said orifices comprises two coaxial cylindrical housings, of which a first housing situated on the side of the obturator is configured to receive one of said bearings, and a second housing is configured to receive said sealing means, said first shoulder of the body being located at the junction of these first and second housings.

10. An aircraft turbine engine, comprising at least one control valve according claim 1.

11. The control valve according to claim 1, wherein the control valve is for an aircraft turbine engine.

* * * * *